US008862577B2

(12) United States Patent
Hao et al.

(10) Patent No.: US 8,862,577 B2
(45) Date of Patent: Oct. 14, 2014

(54) VISUALIZING SENTIMENT RESULTS WITH VISUAL INDICATORS REPRESENTING USER SENTIMENT AND LEVEL OF UNCERTAINTY

(75) Inventors: Ming C. Hao, Palo Alto, CA (US);
Christian Rohrdantz, Constance (DE);
Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 13/209,739

(22) Filed: Aug. 15, 2011

(65) Prior Publication Data
US 2013/0046756 A1 Feb. 21, 2013

(51) Int. Cl.
| G06F 7/00 | (2006.01) |
| G06F 17/30 | (2006.01) |
| G06Q 30/00 | (2012.01) |
| H04N 7/173 | (2011.01) |
| G06Q 30/02 | (2012.01) |

(52) U.S. Cl.
CPC .................................. G06Q 30/0201 (2013.01)
USPC ........... 707/723; 707/748; 705/14.44; 725/24

(58) Field of Classification Search
USPC ................. 707/719–721, 723, 748, 750, 797; 705/14.41, 14.44, 319, 347; 704/235; 725/24
See application file for complete search history.

(56) References Cited

U.S. PATENT DOCUMENTS

| 2008/0250326 | A1 | 10/2008 | Mather | |
| 2009/0048823 | A1 | 2/2009 | Liu | |
| 2009/0193011 | A1* | 7/2009 | Blair-Goldensohn et al. | 707/5 |
| 2009/0193328 | A1 | 7/2009 | Reis | |
| 2009/0265307 | A1* | 10/2009 | Reisman et al. | 707/2 |
| 2010/0023311 | A1 | 1/2010 | Subrahmanian | |
| 2010/0121707 | A1 | 5/2010 | Goeldi | |
| 2010/0306192 | A1 | 12/2010 | Kapur | |
| 2011/0112995 | A1* | 5/2011 | Chang et al. | 706/12 |
| 2012/0197903 | A1* | 8/2012 | Lu et al. | 707/748 |

FOREIGN PATENT DOCUMENTS

| JP | 2007018285 | 1/2007 |
| WO | 2009087636 | 7/2009 |

OTHER PUBLICATIONS

Leung et al. "Sentiment Analysis of Product Reviews" IEEE Symposium on Visual Analytics Science and Technolgy, Oct. 12-13, Atlantic City, NJ 2009.*

Oelke et al. "Visual Opinion Analysis of Customer Feedback Data" IEEE Symposium on Visual Analytics Science and Technology Oct. 12-13, 2009, Atlantic City, New Jersey, USA.*

Zuo et al. "Data Mining strategies and techiques of Internet education public sentiment monitoring and analysis system" 2010 2nd International Conference on Future Computer and Communication Volumn 2, pp. 124-127.*

(Continued)

*Primary Examiner* — Sherief Badawi
*Assistant Examiner* — Berhanu Mitiku (57) ABSTRACT

Sentiment analysis of user feedback is performed, using uncertainty rules. Different levels of uncertainty associated with sentiment results of the sentiment analysis are determined, where the sentiment results identify user sentiments contained in the user feedback. At least one visualization of the sentiment result is provided, where the visualization has first visual indicators to represent respective user sentiments, and second visual indicators associated with the first visual indicators to represent respective levels of uncertainty associated with the respective user sentiments.

20 Claims, 7 Drawing Sheets
(4 of 7 Drawing Sheet(s) Filed in Color)

(56) References Cited

OTHER PUBLICATIONS

Miao et al., 2008 IEEE/WIC/ACM International Conference on Web Intelligence and Intelligent Agent Technology, "A Unified Framework for Opinion Retrieval", 2008 (pp. 739-742).

Duan et al., Computer Science, Advances in Knowledge Discovery and Data Mining, SpringerLink—Abstract, CCRM: An Effective Algorithm for Mining Commodity Information from Threaded Chinese Customer Reviews, 2007 (1 page).

Shi et al., Research Article—Science Alert—An Attribute-based Sentiment Analysis System, Aug. 2010 (9 pages).

Gawalt et al., ACM, Discovering Word Associations in News Media via Feature Selection and Sparse Classification, Mar. 2010 (pp. 211-220).

Zhang et al., IEEE Computer Society 2009, Improving Movie Gross Prediction Through News Analysis, 2009 (pp. 301-304).

Wanner et al., Large-scale Comparative Sentiment Analysis of News Articles, 2009 (2 pages).

Balahur et al., IEEE Computer Society 2009, Opinion Mining on Newspaper Quotations, 2009 (4 pages).

Abbasi et al., ACM Transactions on Information Systems, vol. 26, No. 3, Article 12, Sentiment Analysis in Multiple Lanugages: Feature Selection for Opinion Classification in Web Forums, Jun. 2008 (34 pages).

Zhang et al., ACM Digital Library—Abstract, Sentiment Analysis of Chinese Documents: From Sentence to Document Level, Dec. 2009 (1 page).

Crimson Hexagon Products (www.crimsonhexagon.com), Major Enhancement to Crimson Hexagon Platform Delivers Groundbreaking New Social Media Monitoring and Analysis Capabilities, Oct. 2010 (2 pages).

Sysomos (www.sysomos.com) Best Global Brands Online, Oct. 2009 (4 pages).

Goorha et al., ACM Digital Library—Abstract, Discovery of Significant Emerging Trends, Jul. 2010 (1 page).

Hao et al., Chinese Receiving Office, International Appl. No. PCT/CN2011/000957entitled "Sentiment Trend Visualization Relating to an Event Occurring in a Particular Geographic Region" filed Jun. 8, 2011 (31 pages).

Castellanos et al., U.S. Receiving Office, International Appl. No. PCT/US11/39566 entitled "Determining And Visualizing Social Media Expressed Sentiment" filed Jun. 8, 2011 (25 pages).

Yingcai Wu, OpinionSeer: Interactive Visualization of Hotel Customer Feedback, IEEE, Oct. 2010 (10 pages).

Hao et al., U.S. Appl. No. 13/155,570 entitled "Selecting Sentiment Attributes for Visualization" filed Jun. 8, 2011 (39 pages).

Hao et al., U.S. Appl. No. 12/925,684 entitled "Visual Analysis of a Time Sequence of Events Using a Time Density Track" filed Oct. 27, 2010 (29 pages).

\* cited by examiner

VISUALIZING SENTIMENT RESULTS WITH VISUAL INDICATORS REPRESENTING USER SENTIMENT AND LEVEL OF UNCERTAINTY

BACKGROUND

Users often provide feedback, in the form of reviews, regarding offerings (products or services) of different enterprises. As examples, users can be external customers of an enterprise, or users can be internal users within the enterprise. An enterprise may wish to use feedback to improve their offerings. However, there can be potentially a very large number of received reviews, which can make meaningful analysis of such reviews difficult and time-consuming.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures.

DETAILED DESCRIPTION

An enterprise can receive relatively large amounts of data, such as user feedback, in the form of comments. The comments can be received over a network, such as the Internet or a local network, where users (external users and/or internal users of the enterprise) can supply comments regarding a product or service through the enterprise's website or other accessible location, or through a third party website such as a social networking site. Alternatively, or additionally, comments can be received in paper form and entered by the enterprise's personnel into a system in electronic form. A "comment" or "user comment" can refer to an entire record containing a given user feedback, or some portion of the record (e.g. a sentence, paragraph, or other section of the record).

In some cases, it may be desirable to visually analyze received comments by employing automated visualization of the comments in graphical form (without a user having to read the individual comments). When there is a relatively large number of comments, however, graphical elements representing corresponding comments can be close to each other or can actually overlap each other, particularly when the comments are associated with the same time points or time points that are relatively close to each other. A large number of overlapping graphical elements or graphical elements close to each other can make it difficult to understand what is being represented by the graphical elements.

Analysis of user comments can allow for better understanding of user sentiment regarding an offering of an enterprise. An offering can include a product or a service provided by the enterprise. A "sentiment" refers to an attitude, opinion, or judgment of a human with respect to the offering.

With a relatively large number of comments and associated terms that can appear in such comments, there can be uncertainty in sentiment analysis results. Uncertainty in sentiment analysis results can produce inaccurate information that can cause an enterprise to take incorrect actions to address issues that may be identified by the sentiment analysis.

Figure 1:
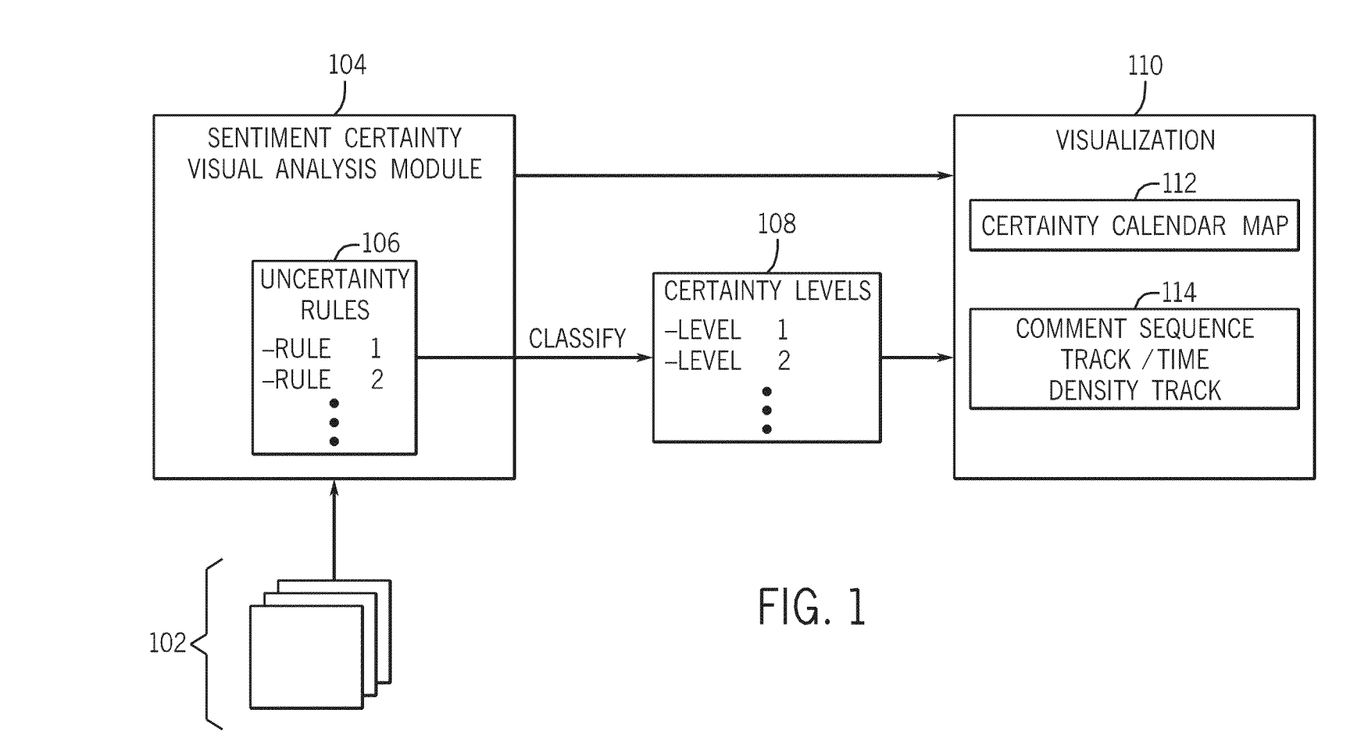
FIG. 1 is a block diagram of an example arrangement incorporating some implementations.

In accordance with some implementations, uncertainty rules (which can also be referred to as "certainty rules") are provided to allow a determination of levels of uncertainty associated with sentiment results produced from a sentiment analysis. FIG. 1 illustrates an example system for performing sentiment certainty visual analysis. User comments 102 (which can be included in documents or records) are received by a sentiment certainty visual analysis module 104. The sentiment certainty visual analysis module 104 analyzes each comment 102 to identify parts of the text within the comment that includes attributes that can be associated with sentiment words. An "attribute" can refer to a noun or compound noun (a noun formed of multiple words, such as "customer service") that exists in a comment. In other examples, an attribute can also include a verb or adjective, or some combination of a noun, verb, or adjective.

Sentiment words in the comment can also be identified, where sentiment words include individual words or phrases (made up of multiple words) that express an attitude, opinion, judgment of a human. Examples of sentiment words include "bad," "poor," "great performance," "fast service," and so forth.

The sentiment certainty visual analysis module 104 can assign sentiment scores to respective attributes in a comment based on use of any of various different sentiment analysis techniques, which involves identifying words or phrases in the comment that relate to sentiment(s) expressed by users with respect to each attribute. A sentiment score can be generated based on the identified words or phrases relating to sentiment(s). The sentiment score provides an indication of whether the expressed sentiment is positive, negative, or neutral. The sentiment score can be a numeric score, or alternatively, the sentiment score can have one of several discrete values (e.g. Positive, Negative, Neutral).

The sentiment result produced by the sentiment certainty visual analysis module 104 can be associated with different degrees of uncertainty. Certain sentiment results may be more certain than other sentiment results.

In accordance with some implementations, the sentiment certainty visual analysis module 104 uses multiple sentiment uncertainty rules 106 to allow for classification of the certainty level (from among multiple certainty levels 108) associated with each instance of a sentiment analysis (performed on a respective comment 102). Alternatively, instead of referring to "certainty levels," reference can be made to "uncertainty levels."

In some examples, the sentiment uncertainty rules 106 include three rules, identified as Rule 1, Rule 2, and Rule 3. Rule 1 specifies that the presence of an attribute and associated sentiment word (or phrase) follows syntactic natural language patterns. One such example syntactic natural language pattern is as follows:

This is a nice (adjective) printer (noun).

In the foregoing example, the attribute is "printer," and the sentiment word associated with this attribute is "nice," which is an adjective. Thus, the foregoing syntactic natural language pattern indicates that an adjective that appears before a noun typically indicates a sentiment word associated with the attribute.

Another example of syntactic natural language pattern is set forth as follows:

This printer (noun) is (verb) really (adverb) bad (adjective).

In the foregoing example, the attribute ("printer") precedes a verb ("is"), which in turn precedes an adverb and/or an adjective. The adverb and/or adjective following the verb is indicative of the presence of a sentiment word or phrase that is associated with the attribute that precedes the verb. Although the foregoing sets forth two example syntactic natural language patterns according to Rule 1, note that there can be other syntactic natural language patterns that are indicative of the presence of an attribute and associated sentiment word(s).

Rules 2 and 3 are rules where the language contained in a user comment does not follow any of the syntactic natural language patterns. Rule 2 specifies that a sentiment word of a given polarity (negative polarity or positive polarity) is close (in proximity) to an attribute. The sentiment of a given polarity that is "close to" or "in proximity to" an attribute can be defined as follows: the sentiment word(s) and the attribute are located within a given section of the comment (e.g. a given sentence, a given paragraph, etc.), and/or the sentiment word(s) and attribute are within some predefined number of words of each other. An example of a scenario that satisfies Rule 2 is set forth as follows:

I bought a new printer (noun) and so far I am really satisfied with it.

In the foregoing example, the attribute is "printer," and a sentiment of a positive polarity is close (within some predefined number of words) to the attribute ("really satisfied"), and the attribute and positive polarity word(s) are located in the same sentence.

Rule 3 specifies the situation where the sentiment word(s) and attribute do not follow any syntactic natural language pattern, and sentiments of both polarities (negative polarity and positive polarity) are close or are in proximity to each other (within a given number of words and/or within a given section of the comment). An example of such a scenario is set forth as follows:

Some people write bad reviews and other people like everything about this printer (noun).

In the foregoing example, the attribute is "printer," and there are two sentiments of different polarities ("bad reviews" and "like everything") expressed in the same sentence.

In a situation that satisfies Rule 3, a distance-weighted mapping can be applied to derive the overall sentiment associated with the attribute. In the foregoing example, since "like everything" is closer to the attribute "printer" than "bad reviews," the positive sentiment ("like everything") would be more heavily weighted than the negative sentiment ("bad reviews").

Although the foregoing sets forth three example sentiment uncertainty rules, note that in alternative implementations, there can be additional or different sentiment uncertainty rules.

The different sentiment uncertainty rules are associated with different levels of certainty (or different levels of uncertainty). A sentiment result that satisfies Rule 1 can be assigned a high certainty (or low uncertainty), a sentiment result that satisfies Rule 2 can be assigned a medium certainty (or medium uncertainty), and a certainty result that satisfies Rule 3 can be assigned a low certainty (or high uncertainty). The high certainty, medium certainty, and low certainty can be associated with respective numeric scores, or alternatively, the different certainty levels can simply be assigned discrete values, such as "high," "medium," and "low."

There can be special cases where none of the rules are satisfied. For example, the attribute can be a sentiment word, such that the sentiment value associated with this sentiment word (that makes up the attribute) is ignored. If no sentiment can be identified using any of the foregoing rules, the sentiment result in this scenario is assigned a low certainty level.

Another example of special processing involves an attribute that is mentioned multiple times in a sentence. A certainty value of each instance can be complemented with an algebraic sign of the corresponding sentiment. A negative sentiment with medium certainty can be assigned an example value such as −2, while a positive sentiment with high certainty can be assigned a second value such as +3. The values are then aggregated (e.g. summed) and the resulting aggregate value can be decomposed into sentiment and certainty values. In an example, a negative instance of the attribute of medium certainty and a positive instance of the attribute of high certainty within a sentence can be evaluated as a positive sentiment result with low certainty (e.g. −2+3=+1).

Figure 2:
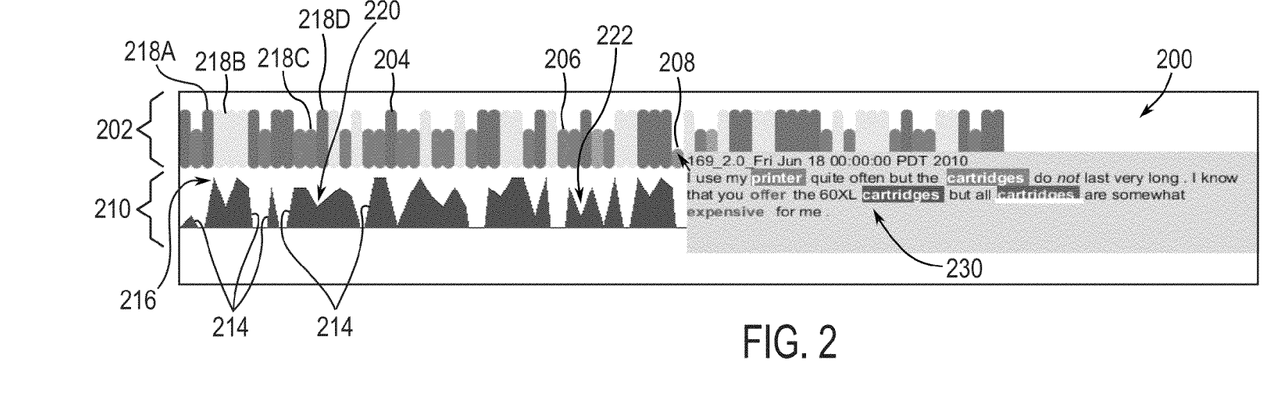
FIGS. 2-5 illustrate different example visualizations according to various implementations.

FIG. 2 depicts a visualization that includes a sequence 202 of comments, where the sequence 202 represents a temporal order of the comments as they are received. The sequence 202 of comments can also be referred to as a comment sequence track that has a sequence of graphical elements (in the form of general ovals or rectangles with curved ends) each representing a corresponding comment. The graphical elements in the comment sequence track 202 are arranged such that they do not overlap each other.

Although, the graphical elements in the comment sequence track 202 are arranged in sequential temporal order, the exact time points associated with the comments are not relevant to the comment sequence track 202. The comment sequence track 202 maintains the temporal order, but removes any space-consuming time gaps and removes overlap of graphical elements representing respective comments. Thus, in the comment sequence track 202, the horizontal axis does not convey exact temporal relations; instead, the same amount of space (equal space) is provided to each graphical element in the comment sequence track 202 such that a user can clearly see the arrival sequence of the graphical elements (note that none of the graphical elements in the comment sequence track 202 is occluded by another of the graphical elements).

The graphical elements in the comment sequence track 202 are assigned different colors corresponding to different values of a respective attribute of the respective comment. In examples according to FIG. 2, the colors that can be assigned to each of the graphical elements of the comment sequence track 202 include grey, green, and red. A grey color assigned to the attribute indicates that the associated sentiment is neutral (not negative and not positive). A green color indicates positive feedback (e.g. a customer is satisfied with the attribute). On the other hand, red represents a negative feedback (e.g. the customer is not satisfied with the attribute). Graphical elements can also be assigned different (lighter or darker) shades of red or green, to indicate different levels of negative or positive sentiment.

The height of each graphical element in the comment sequence track 202 indicates the certainty level of the respective sentiment result that is expressed by the corresponding color (green, red, or grey). If the sentiment result for a comment has high certainty, then the corresponding graphical element (such as graphical element 204) has a full height. However, if the sentiment result for the corresponding comment has a medium certainty, then the corresponding graphical element (such as graphical element 206) has a second height that is less than the full height (such as ⅔ of the full height). If the sentiment result associated with the comment is low certainty, then the corresponding graphical element (such as graphical element 208) has a third height that is lower than the second height (e.g. ⅓ of the full height). Generally, according to some implementations, a higher certainty associated with a sentiment result for a comment is associated with a higher height of the corresponding graphical element, while a lower certainty associated with a sentiment result is associated with a lower height. In other examples, higher certainty can be indicated with a lower height, while lower certainty can be indicated with a higher height. Even more generally, different sizes of the respective graphical elements indicate different certainty levels.

In yet further implementations, different visual indicators can be used to indicate different certainty levels in the comment sequence track 202, such as by use of different fill patterns in the graphical elements.

Since the inter-temporal information (in other words, time gaps between comments) has been removed in the comment sequence track 202, a time density track 210 is also provided in the visualization 200, in some examples. The time density track 210 has gap representing elements to represent time gaps between respective successive comments. In the example of FIG. 2, the gap representing elements of the time density track 210 includes points along a curve 214. The height of a point along the curve 214 represents the time gap between two successive comments represented by two successive graphical elements of the comment sequence track 202. The gap representing elements of the time density track 210 are aligned with the graphical elements of the comment sequence track 202 to allow for easy correlation between the time density track 210 and the comment sequence track 202.

For example, a point 216 that has a high value indicates that the comments represented by respective graphical elements 218A and 218B in the comment sequence track 202 are relatively close to each other in time (and in fact, can overlap each other). Another point 220 that has an above average height in the time density track 210 indicates that two successive comments represented by graphical elements 218C and 218D in the comment sequence track 202 are relatively close to each other (they do not overlap but have a relatively short time gap in between).

Another point 222 having a below average height indicates that the two corresponding comments represented by two respective graphical elements in the comment sequence track 202 have a medium time gap between each other. A zero height of a point along the curve 214 indicates that there is a relatively long time gap between successive comments.

By looking at the curve 214 of the time density track 210, an analyst can quickly identify points along the comment sequence track 202 that would be more interesting (for example, points along the comment sequence track 202 associated with negative feedback and where the comments are arriving relatively close in time to each other). Such an "interesting" point along the comment sequence track 202 can correspond to times when some problem has occurred, such as a website crashing, a product being out of stock, and so forth. Since the graphical elements of the comment sequence track 202 do not occlude each other, a user can go to any point along the comment sequence track 202 and select, using an input device, respective ones of the graphical elements to obtain further detail (such as in pop-up box 230) regarding the respective comments.

Generally, the visualization 200 in FIG. 2 is able to accept interactive user input. In this manner, the user can interactively select further details regarding comments at the individual comment level. Also, by looking at the combination of the comment sequence track 202 and time density track 210, patterns can become more visible to the analyst. The pattern can be based on colors of the graphical elements of the comment sequence track 202, heights of the graphical elements indicating respective certainty levels, and the varying heights of the curve 214 in the time density track 210.

Figure 3:
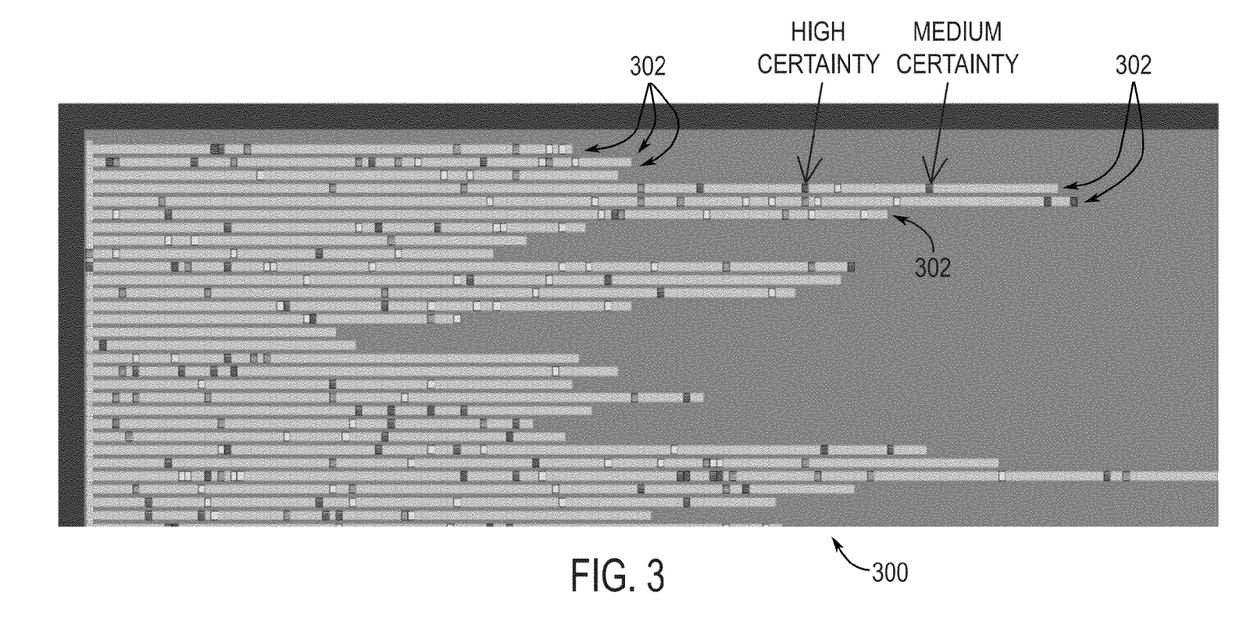

FIG. 3 illustrates a different type of visualization, in this case a certainty calendar map 300. The certainty calendar map 300 has multiple rows 302, where each row 302 has blocks (or other graphical elements) representing corresponding comments. Each block in a row 302 represents a respective comment. Each row can represent a corresponding time interval, such as a corresponding day. In the foregoing example, the multiple rows 302 of the certainty calendar map 300 represent respective days of a certain month. In other examples, the different rows 302 can represent other time intervals, such as hours, weeks, months, years, and so forth.

The length (corresponding to the number of blocks) of each row 302 indicates the number of comments that were received in the respective time interval (e.g. day). The longer a row 302, the greater the number of comments received in that particular day. The color within each block represents a respective sentiment of the comment (green indicates positive sentiment, grey indicates neutral sentiment, and red indicates negative sentiment).

While color assigned to each block indicates the respective sentiment for the corresponding comment, a different visual indicator, in the form of an amount of filling or some other visual indicator, indicates the certainty level associated with the respective sentiment result. A full filling (in other words the block is completely filled with the respective color) indicates that the associated sentiment result has high certainty. A medium filling in the block indicates medium certainty, and a low filling in the block indicates low certainty.

In different examples, instead of multiple rows indicating different time intervals, the certainty calendar map 300 can be made up of multiple columns, where the multiple columns (each having multiple blocks representing respective comments) represent respective time intervals. More generally, the certainty calendar map 300 has plural lines (rows or columns) each having respective blocks representing corresponding comments; each of the plural lines represents a respective time interval.

Figure 4:
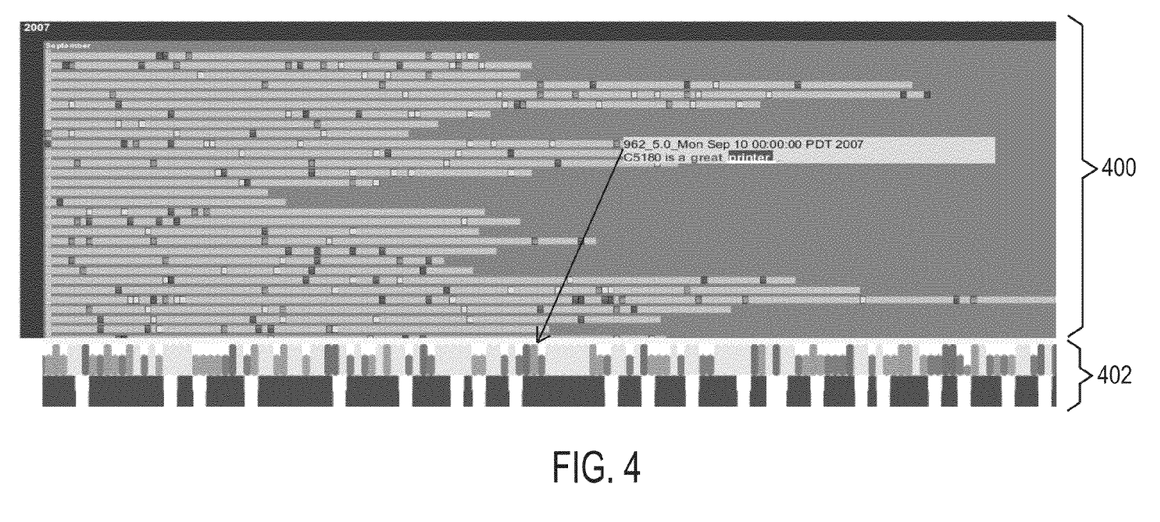

FIG. 4 illustrates another type of visualization, in which both a certainty calendar map 400 and a visualization 402 that includes a comment sequence track and time density track (similar to that shown in FIG. 2), are depicted together. The visualization 402 that includes the comment sequence track and time density track can correspond to one of the rows in the certainty calendar map 400.

Figure 5:
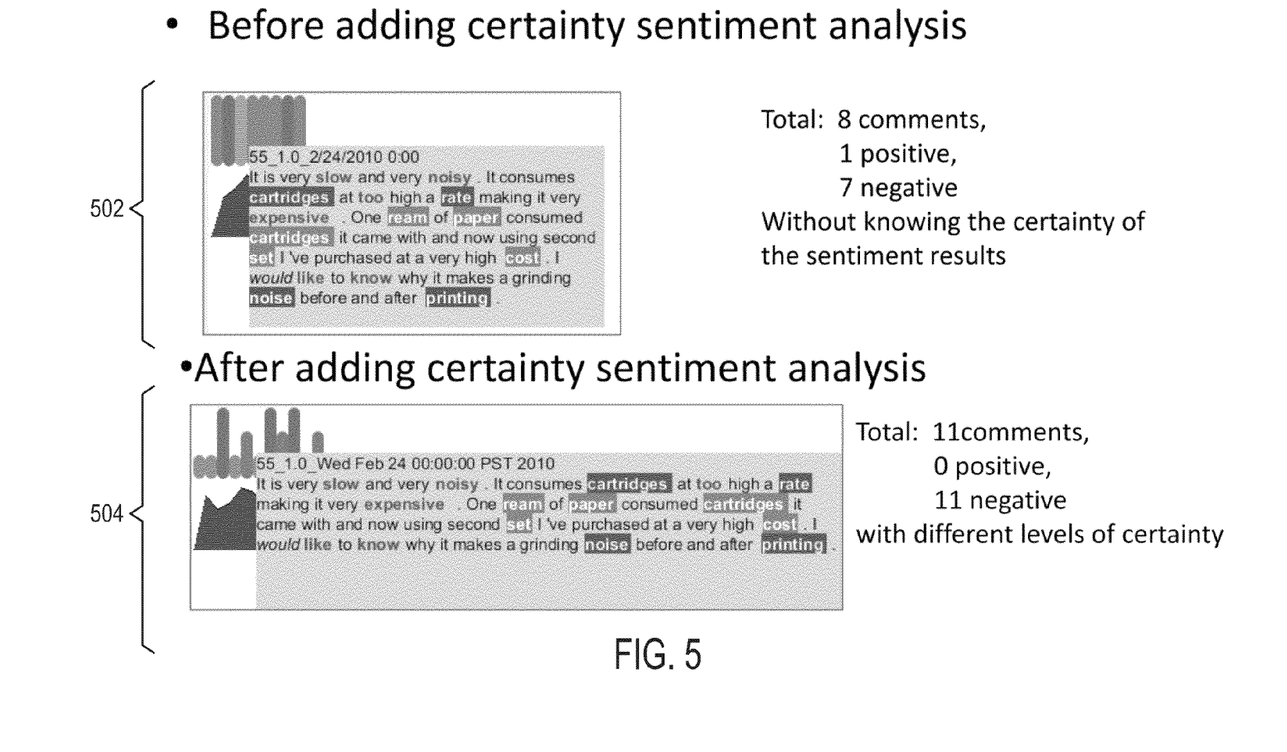

FIG. 5 illustrates an example in which sentiment result accuracy can be enhanced by using the sentiment uncertainty rules according to some implementations. A sentiment visualization 502 is produced by a sentiment analysis without application of sentiment uncertainty rules as discussed above. In the sentiment visualization 502, the different graphical elements of a comment sequence track have equal height, so that an analyst would have no idea what certainty levels are associated with the sentiment results of the respective comments.

On the other hand, a sentiment visualization 504 is produced by a sentiment analysis with application of uncertainty rules as discussed above. In the comment sequence track of the sentiment visualization 504, an analyst can easily see certainty levels associated with respective sentiment results of the respective comments.

Figure 6:
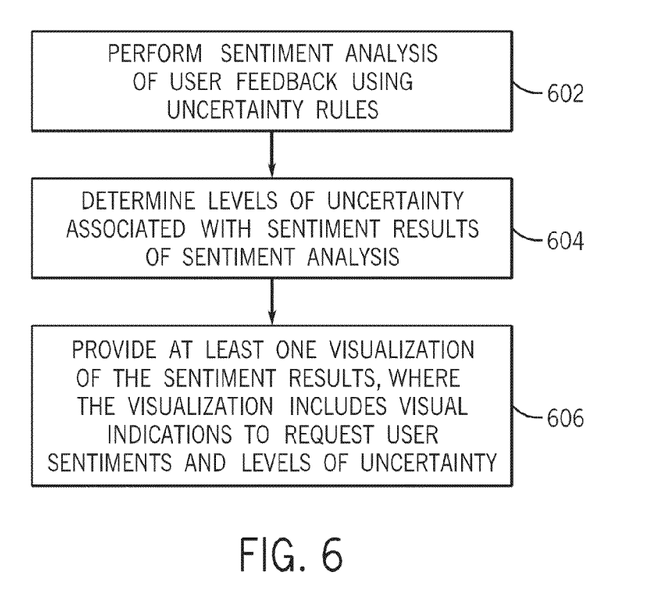
FIG. 6 is a flow diagram of an example containing visual analysis techniques according to some implementations.

FIG. 6 is a flow diagram of a process according to some implementations. The process performs (at 602) sentiment analysis of user feedback (that includes multiple comments), where the sentiment analysis uses sentiment uncertainty rules, as discussed above. The process determines (at 604)

levels of uncertainty associated with sentiment results of the sentiment analysis, where the sentiment results identify user sentiments contained in the user feedback.

The process then provides (at 606) at least one visualization of the sentiment results, where the visualization has first visual indicators to represent respective user sentiments, and second visual indicators associated with the first visual indicators to represent respective levels of uncertainty associated with the respective user sentiments. The at least one visualization provided at 606 can include the visualization 200 of FIG. 2, the sentiment calendar map 300 of FIG. 3, or the combined visualizations of FIG. 4.

Figure 7:
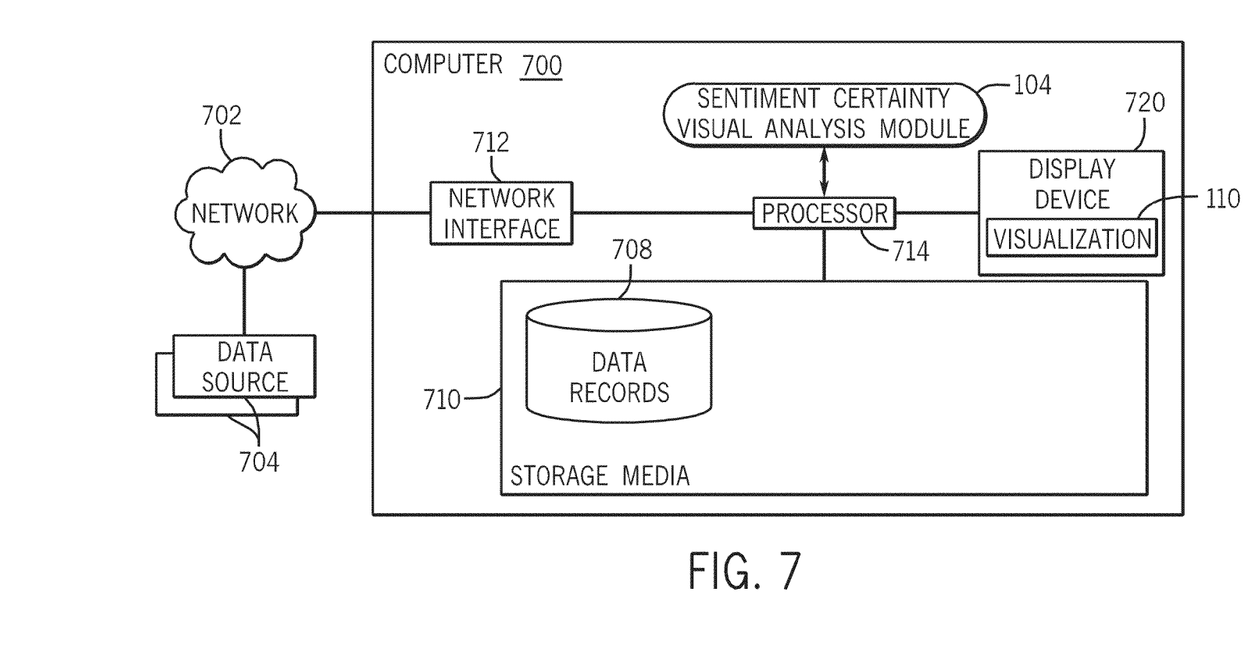
FIG. 7 is a block diagram of an example system incorporating a sentiment certainty visual analysis mechanism according to some implementations.

FIG. 7 is a block diagram of an example system that includes a computer 700 coupled over a network 702 to various data sources 704. The data sources 704 collect data records (containing user comments) that are entered into the computer 700. The data records can be stored in a database 708 in storage media 710.

The computer 700 has a network interface 712 to communicate over the network 702. The network interface 712 is connected to a processor (or multiple processors) 714. The sentiment certainty visual analysis module 104 is executable on the processor(s) 714 to perform the tasks of FIG. 6 (and/or other tasks) and to present various visual representations (110) as discussed above in a display device 720.

The sentiment certainty visual analysis module 104 can include machine-readable instructions that are loaded for execution on processor(s) 714. A processor can include a microprocessor, microcontroller, processor module or subsystem, programmable integrated circuit, programmable gate array, or another control or computing device.

The storage media 710 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of a system having a processor, comprising:
performing sentiment analysis of user feedback using a plurality of uncertainty rules, wherein the uncertainty rules include a first rule indicating that an attribute and an associated sentiment word or phrase within a comment follow a syntactic natural language pattern, and a second rule indicating that an attribute and an associated sentiment word or phrase within a comment do not follow the syntactic natural language pattern;
determining levels of uncertainty associated with sentiment results of the sentiment analysis, wherein the sentiment results identify user sentiments contained in the user feedback, and wherein determining the levels of uncertainty comprises: assigning a lower level of uncertainty for a first of the sentiment results if the first sentiment result satisfies the first rule, and assigning a higher level of uncertainty for a second of the sentiment results if the second sentiment result satisfies the second rule; and
providing at least one visualization of the sentiment results, wherein the visualization has first visual indicators to represent the respective user sentiments identified by the sentiment results, and second visual indicators associated with the first visual indicators to represent the respective levels of uncertainty associated with the corresponding user sentiments.

2. The method of claim 1, wherein providing the at least one visualization comprises providing a certainty calendar map having lines of graphical elements, where the graphical elements represent corresponding comments in the user feedback, where the lines correspond to respective different time intervals, and a particular one of the lines includes a plurality of graphical elements, at least one of the plurality of graphical elements assigned a first visual indicator to represent a particular user sentiment in the corresponding comment, and assigned a second visual indicator to represent a level of uncertainty of the particular user sentiment.

3. The method of claim 2, wherein the first visual indicator of the at least one graphical element is one of plural different colors that represent different user sentiments.

4. The method of claim 3, wherein the second visual indicator of the at least one graphical element is one of plural different fillings of the color, wherein the plural different fillings representing respective different levels of uncertainty.

5. The method of claim 1, wherein providing the at least one visualization comprises providing a comment sequence track having graphical elements representing different comments in the user feedback, wherein a particular one of the graphical elements has a first visual indicator representing a user sentiment in the corresponding comment, and has a second visual indicator representing a level of uncertainty of the user sentiment.

6. The method of claim 5, wherein the first visual indicator of the particular graphical element is one of plural different colors that represent different user sentiments.

7. The method of claim 6, wherein the second visual indicator is one of plural different heights of the particular graphical element, the different heights representing different levels of uncertainty of the user sentiment.

8. The method of claim 1, wherein the second rule specifies that a sentiment word or phrase of a particular one of multiple polarities is in a proximity of an attribute.

9. The method of claim 1, wherein the uncertainty rules further include a third rule specifying that sentiment words or phrases of multiple polarities are in proximity to an attribute, and wherein determining the levels of uncertainty further comprises assigning a further higher level of uncertainty for a third of the sentiment results if the third sentiment result satisfies the third rule, the further higher level of uncertainty higher than the higher level of uncertainty assigned for the second sentiment result.

10. An article comprising at least one non-transitory computer-readable storage medium storing instructions that upon execution cause a system to:

apply a plurality of uncertainty rules during performance of sentiment analysis of user feedback, wherein the uncertainty rules include a first rule indicating that an attribute and an associated sentiment word or phrase within a comment follow a syntactic natural language pattern, and a second rule indicating that an attribute and an associated sentiment word or phrase within a comment do not follow the syntactic natural language pattern;

assign levels of uncertainty to respective sentiment results of the sentiment analysis, wherein the sentiment results identify user sentiments contained in the user feedback, and wherein assigning the levels of uncertainty comprises: assigning a lower level of uncertainty for a first of the sentiment results if the first sentiment result satisfies the first rule, and assigning a higher level of uncertainty for a second of the sentiment results if the second sentiment result satisfies the second rule; and present at least one visualization of the sentiment results, wherein the visualization has first visual indicators to represent the respective user sentiments identified by the sentiment results, and second visual indicators associated with the first visual indicators to represent the respective levels of uncertainty associated with the corresponding user sentiments.

11. The article of claim 10, wherein the visualization has graphical elements representing respective comments in the user feedback, where each of the graphical elements has a corresponding one of the first visual indicators and a corresponding one of the second visual indicators.

12. The article of claim 11, wherein the first visual indicators include plural different colors representing different user sentiments, including a positive sentiment, a neutral sentiment, and a negative sentiment.

13. The article of claim 12, wherein the second visual indicators include different sizes to represent different levels of uncertainty.

14. The article of claim 12, wherein the second visual indicators include different amounts of filling within the graphical elements to represent different levels of uncertainty.

15. The article of claim 10, wherein the visualization includes a certainty calendar map having multiple lines, wherein each of the lines include a plurality of graphical elements representing respective comments in the user feedback, and wherein each of the graphical elements is assigned a corresponding one of the first visual indicators and a corresponding one of the second visual indicators.

16. The article of claim 10, wherein the visualization includes a comment sequence track having graphical elements representing respective comments in the user feedback, wherein each of the graphical elements is assigned a corresponding one of the first visual indicators and a corresponding one of the second visual indicators.

17. A system comprising:
a storage medium to store data records relating to user feedback; and
at least one processor to:
perform sentiment analysis of user feedback using a plurality of uncertainty rules, wherein the uncertainty rules include a first rule indicating that an attribute and an associated sentiment word or phrase within a comment follow a syntactic natural language pattern, and a second rule indicating that an attribute and an associated sentiment word or phrase within a comment do not follow the syntactic natural language pattern;
determine levels of uncertainty associated with sentiment results of the sentiment analysis, wherein the sentiment results identify user sentiments contained in the user feedback, and wherein determining the levels of uncertainty comprises: assigning a lower level of uncertainty for a first of the sentiment results if the first sentiment result satisfies the first rule, and assigning a higher level of uncertainty for a second of the sentiment results if the second sentiment result satisfies the second rule; and
provide at least one visualization of the sentiment results, wherein the visualization has first visual indicators to represent the respective user sentiments identified by the sentiment results, and second visual indicators associated with the first visual indicators to represent the respective levels of uncertainty associated with the respective user sentiments.

18. The system of claim 17, wherein the visualization has plural graphical elements representing respective ones of comments in the user feedback, wherein each of the plural graphical elements is assigned a corresponding one of the first visual indicators, and a corresponding one of the second visual indicators.

19. The system of claim 18, wherein the first visual indicators include different colors to represent different user sentiments, and the second visual indicators are of a different type than the first visual indicators.

20. The article of claim 12, wherein the second visual indicators include different heights of the graphical elements to represent different levels of uncertainty.

* * * * *